(12) United States Patent
DeAngelis et al.

(10) Patent No.: US 7,628,039 B2
(45) Date of Patent: Dec. 8, 2009

(54) SYSTEM AND METHOD FOR CONTROLLING THE ENVIRONMENTAL AROUND ONE OR MORE VESSELS IN A GLASS MANUFACTURING SYSTEM

(75) Inventors: Gilbert DeAngelis, Lindley, NY (US); Raymond E. Fraley, Waverly, NY (US); Jeffrey D. Girton, Harrodsburg, KY (US); David M. Lineman, Painted Post, NY (US); Rand A. Murnane, Big Flats, NY (US); Robert R. Thomas, Watkins Glen, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/366,245

(22) Filed: Feb. 5, 2009

(65) Prior Publication Data

US 2009/0241602 A1 Oct. 1, 2009

Related U.S. Application Data

(62) Division of application No. 11/116,669, filed on Apr. 27, 2005, now abandoned.

(51) Int. Cl.
*C03B 37/014* (2006.01)
*C03B 5/00* (2006.01)
*C03B 5/16* (2006.01)

(52) U.S. Cl. .......... 65/157; 65/134.1; 65/134.2; 65/134.4

(58) Field of Classification Search ..... 65/134.1–134.9, 65/157
See application file for complete search history.

(56) References Cited

U.S. PATENT DOCUMENTS

| | | | |
|---|---|---|---|
| 3,338,696 A | 8/1967 | Dockerty | 65/145 |
| 3,607,166 A | 9/1971 | Loughridge et al. | 65/17.6 |
| 3,682,609 A | 8/1972 | Dockerty | 65/83 |
| 3,970,442 A | 7/1976 | Gulotta | 65/32.5 |
| 4,351,664 A | 9/1982 | Bansal | 65/128 |
| 5,785,726 A | 7/1998 | Dorfeld et al. | 65/134.1 |

(Continued)

*Primary Examiner*—Steven P Griffin
*Assistant Examiner*—Jodi Cohen
(74) *Attorney, Agent, or Firm*—Siwen Chen; William J. Tucker (57) ABSTRACT

A system and method are described herein that control the environment (e.g., oxygen, hydrogen, humidity, temperature, gas flow rate, pressure) around one or more vessels in a glass manufacturing system. In the preferred embodiment, the system includes a closed-loop control system and a capsule that are used to control the level of hydrogen around the exterior (non glass contact surface) of the vessel(s) so as to suppress the formation of gaseous inclusions and surface blisters in glass sheets. In addition, the closed-loop control system and capsule can be used to help cool molten glass while the molten glass travels from one vessel to another vessel in the glass manufacturing system. Moreover, the closed-loop control system and capsule can be used to maintain an atmosphere with minimal oxygen around the vessel(s) so as to reduce the oxidation of precious metals on the vessel(s).

14 Claims, 3 Drawing Sheets

U.S. PATENT DOCUMENTS

| | | | |
|---|---|---|---|
| 5,824,127 A | 10/1998 | Bange et al. | 65/90 |
| 6,128,924 A | 10/2000 | Bange et al. | 65/90 |
| 6,158,246 A | 12/2000 | Borrelli et al. | 65/30.1 |
| 6,629,437 B1 | 10/2003 | Baucke et al. | 65/134.9 |
| 6,993,936 B2 | 2/2006 | Grzesik et al. | 65/134.9 |
| 2001/0039814 A1 | 11/2001 | Pittbladdo | 65/193 |
| 2004/0067369 A1 | 4/2004 | Ott et al. | 428/432 |
| 2004/0177649 A1 | 9/2004 | Dorfeld et al. | 65/90 |
| 2005/0050923 A1 | 3/2005 | Grzesik et al. | 65/135.6 |
| 2005/0109062 A1 | 5/2005 | Stelle et al. | 65/32.1 |

SYSTEM AND METHOD FOR CONTROLLING THE ENVIRONMENTAL AROUND ONE OR MORE VESSELS IN A GLASS MANUFACTURING SYSTEM

CROSS-REFERENCE TO RELATED APPLICATIONS

This is a divisional application of U.S. patent application Ser. No. 11/116,669 filed on Apr. 27, 2005 now abandoned and entitled "SYSTEM AND METHOD FOR CONTROLLING THE ENVIRONMENT AROUND ONE OR MORE VESSELS IN A GLASS MANUFACTURING SYSTEM" and claims the benefit thereof under 35 U.S.C. §120.

BACKGROUND OF THE INVENTION

1. Field of the Invention

The present invention relates to a system and method for controlling the environment (e.g., oxygen, hydrogen, humidity, temperature, gas flow rate) around one or more vessels in a glass manufacturing system.

2. Description of Related Art

Flat panel display devices like Liquid Crystal Displays (LCDs) utilize flat glass sheets. A preferred technique for manufacturing these glass sheets is the fusion process. In the fusion process, the glass sheets are made by using vessels that contain refractory/precious metals, e.g. platinum or platinum alloys. The precious metals are generally considered to be inert in relation to most glasses, and thus should not cause any inclusions in the glass sheets.

However, this is not necessarily valid. There are oxidation reactions that occur at the metal/glass interface inside the vessels which lead to the generation of gaseous inclusions in the glass melt and thus the glass sheet. One of the more common oxidation reactions that occurs at the metal/glass interface is the conversion of negatively charged oxygen ions to molecular oxygen which is caused by the thermal breakdown of water and hydroxyl species in the glass melt. This phenomenon occurs because at the elevated temperatures of glass melting and delivery, a low partial pressure of hydrogen exists in the glass melt. And, when hydrogen comes in contact with the refractory/precious metal vessel containing the glass melt, the hydrogen rapidly permeates out of the vessel, depleting the metal/glass interface of hydrogen. Based on the chemical balance, for every mole of hydrogen that leaves the vessel, ½ mole of oxygen is left behind at the glass/metal interface. Thus, as hydrogen leaves the vessel, the oxygen level or partial pressure of oxygen at the metal/glass interface increases, which leads to the generation of blisters or gaseous inclusions in the glass melt. In addition, there are other reactions which involve the catalyzing or oxidation of other species in the glass melt such as halogens (Cl, F, Br) which can lead to the generation of gaseous inclusions. Further, the oxidation reactions can occur due to electrochemical reactions at the metal/glass interface. These electrochemical reactions can be associated with thermal cells, galvanic cells, high AC or DC current applications and grounding situations.

Today, there are several known methods that can be used to address these problematical oxidation reactions which cause the formation of gaseous inclusions in the glass sheet. One known method that can be used to help minimize the formation of gaseous inclusions in glass sheets involves the use of arsenic as a fining agent within the fusion process. Arsenic is among the highest temperature fining agents known, and, when added to the molten glass bath, it allows for $O_2$ release from the glass melt at high melting temperatures (e.g., above 1450° C.). This high temperature $O_2$ release, which aids in the removal of $O_2$ bubbles during the melting and fining stages of glass production results in a glass sheet that is essentially free of gaseous inclusions. Furthermore, any residual oxygen bubbles are reabsorbed by the fining agent due to transition from the reduced to oxidized state on cooling. However, from an environmental point of view it is not desirable to use arsenic since it is considered a hazardous material.

There are several other known methods that do not need arsenic fining agents to mitigate oxidation reactions which lead to the formation of gaseous inclusions in the glass sheets. One such method is described in U.S. Pat. No. 5,785,726 which discloses a humidity controlled enclosure that surrounds one or more platinum-containing vessels and is used to control the partial pressure of hydrogen outside the vessel (s) so as to reduce the formation of gaseous inclusions in glass sheets. This humidity controlled enclosure is discussed in more detail below. Although the method disclosed in the patent mentioned above successfully reduces the formation of gaseous inclusions in the glass sheets, it would be desirable to provide an alternative method to prevent the formation of gaseous inclusions in glass sheets. This need and other needs are satisfied by the system and method of the present invention.

BRIEF DESCRIPTION OF THE INVENTION

The present invention includes a system and method for controlling the environment (e.g., oxygen, hydrogen, humidity, temperature, gas flow rate) around one or more vessels in a glass manufacturing system. In the preferred embodiment, the system includes a closed-loop control system and a capsule that are used to control the level of hydrogen around the exterior (non glass contact surface) of the vessel(s) so as to suppress the formation of gaseous inclusions and surface blisters in glass sheets. In addition, the closed-loop control system and capsule can be used to help cool molten glass while the molten glass travels from one vessel to another vessel in the glass manufacturing system. Moreover, the closed-loop control system and capsule can be used to maintain an atmosphere with minimal oxygen around the vessel(s) so as to reduce the oxidation of precious metals on the vessel (s).

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 1:
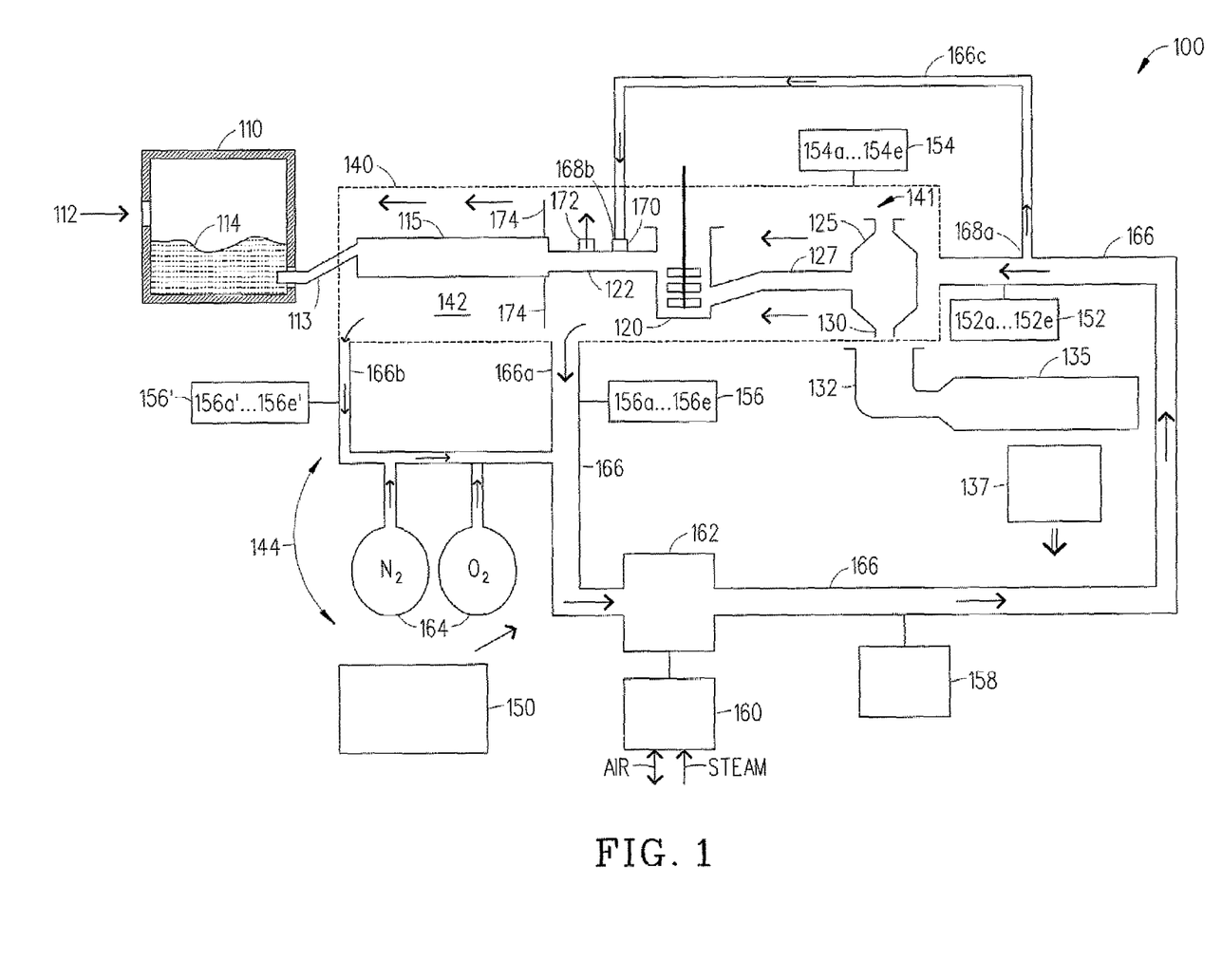
FIG. 1 is a block diagram that shows the components of a glass manufacturing system in accordance with the present invention.

Referring to FIG. 1, there is shown a schematic view of an exemplary glass manufacturing system 100 that uses the fusion process to make glass sheets 137 in accordance with the present invention. The glass manufacturing system 100 includes a melting vessel 110 in which batch materials are introduced as shown by arrow 112 and then melted to form molten glass 114. The melting vessel 110 is typically made from a refractory material. The glass manufacturing system 100 further includes components that are typically made from platinum or platinum-containing metals such as Pt—Rh, Pt—Ir, etc, and combinations thereof. The platinum-containing components include a premelt to finer connection tube (PMFCT) 113, fining vessel 115 (e.g., finer tube 115), a mixing vessel 120 (e.g., stir chamber 120), a finer to stir chamber connecting tube 122, a delivery vessel 125 (e.g., bowl 125), a stir chamber to bowl connecting tube 127, a downcomer 130 and an inlet 132. The inlet 132 is coupled to a forming vessel 135 (e.g., fusion pipe 135) which forms the glass sheet 137. Typically, the forming vessel 135 is made from a refractory material.

In one embodiment of the present invention, the melting/delivery system 141 which includes vessels 115, 120, 125 and tubes 122, 127 and 130 is encapsulated or encased within a capsule 140. A jacket volume 142 is defined between the interior walls of the capsule 140 and the exterior walls of the components 115, 120, 122, 125, 127 and 130 in the melting/delivery system 141. The capsule 140 is preferably leak tight to the extent that it may be used for maintaining a slightly more positive pressure of low oxygen, moist atmosphere inside the jacket volume 142 that is greater than the ambient conditions. As shown, the capsule 140 can be made as one zone which encloses the entire length of the melting/delivery system 141. Alternatively, multiple capsules 140 can be used as multiple zones where individual capsules 140 enclose one or more of the vessels 115, 120, 125 and tubes 122, 127 and 130. An advantage of utilizing multiple capsules 140 is the ability to independently control the atmosphere in a particular area of the melting/delivery system 141.

The present invention also includes a closed-loop control system 144 which controls the environment/atmosphere within the capsule 140 and prevents the problematical oxidation reactions from occurring at the metal/glass interface inside components 115, 120, 122, 125, 127 and 130. Again, the problematical oxidation reactions lead to the formation of gaseous inclusions in the glass sheet 137. In addition, problematical oxidation reactions with the precious metal vessels and tubes can lead to the failure of the platinum (or other precious metals) on the components 115, 120, 122, 125, 127 and 130.

In particular, the closed-loop control system 144 controls the atmosphere inside the capsule 140 so as to suppress undesirable oxidation reactions at the metal/glass interface by causing the migration of hydrogen into the glass/metal interface. A controlled level of hydrogen permeation into the glass/metal interface reduces the production of undesirable species such as molecular oxygen, and halogens, which in turn prevents the formation of undesirable gaseous inclusions in the molten glass 114. The hydrogen permeation into the glass/metal interface is achieved by supplying a higher partial pressure of hydrogen to the exterior surfaces (non glass contact surfaces) in the mixing/delivery system 141, relative to the interior glass/metal interfaces. To accomplish this, a humid, low oxygen atmosphere, which results in a controlled level of hydrogen at the non-glass contact surface of the platinum system that is preferably greater than 12 ppm at 1650° C., is maintained inside the capsule 140. It should be noted that the hydrogen level in the atmosphere inside the capsule 140 has an undetectable amount of hydrogen. However, hydrogen is generated when the water breaks down at the high temperatures associated with the molten glass 114. One gas system that could be used to create this atmosphere would be a mixture of water vapor, oxygen and nitrogen (or another inert gas like argon or helium). An exemplary closed-loop control system 144 that uses this gas system to create such an atmosphere inside the capsule 140 is described next.

The exemplary closed-loop control system 144 includes a controller 150 that obtains sensor readings from one or more locations within and outside the capsule 140. As shown, the controller 150 can obtain sensor readings from capsule supply sensors 152, capsule sensors 154 and capsule exit sensors 156 and 156'. In this example, the capsule supply sensors 152 include a flow sensor 152a, a dew point/humidity sensor 152b, a temperature sensor 152c, an oxygen sensor 152d, and a pressure sensor 152e. The capsule sensors 154 include a flow sensor 154a, a dew point/humidity sensor 154b, a temperature sensor 154c, an oxygen sensor 154d, and a pressure sensor 154e. And, the capsule exit sensors 156 and 156' each include a flow sensor 156a and 156a', a dew point/humidity sensor 156b and 156b', a temperature sensor 156c and 156c', an oxygen sensor 156d and 156d', and a pressure sensor 156e and 156e'

The controller 150 processes the sensor measurements and controls different devices like a humidity feed system 158, a heating/cooling control system 160, air handler(s) 162 and an $O_2/N_2$ makeup system 164. The air handler(s) 162 have access to air and steam. All of the devices 158, 160, 162 and 164 are connected to a network of pipes 166 which as shown is connected to the capsule 140. In operation, the controller 150 controls the devices 158, 160, 162 and 164 to create an environment/atmosphere inside the capsule 140 where the hydrogen which is generated by the decomposition of water vapor is done so at a rate that is equal to or greater than the rate of hydrogen permeation through the metal walls of components 115, 120, 122, 125, 127 and 130 that would be occurring if an ambient atmosphere were present at the non-glass contact surface of the components. And, when there is a higher partial pressure of hydrogen, the reduction of undesirable species such as molecular oxygen, and halogens within the molten glass 114 prevents the formation of undesirable gaseous inclusions in the molten glass 114. Another advantage of having a higher pressure of hydrogen is that the rate of oxidation of the platinum containing components 115, 120, 122, 125, 127 and 130 is reduced or possible eliminated due to the low level of oxygen inside the capsule 140.

To suppress the formation of inclusions in molten glass 114, the level of hydrogen on the exterior surfaces of the platinum containing components 115, 120, 122, 125, 127 and 130 needs to be equal to or greater than the level of hydrogen on the inside surfaces of the components 115, 120, 122, 125, 127 and 130. The hydrogen level on the exterior surfaces of the platinum containing components 115, 120, 122, 125, 127 and 130 is determined by the thermodynamic equilibrium of the water decomposition reaction $H_2O \rightarrow H_2 + \frac{1}{2}O_2$. In accordance with thermodynamic tables, the free energy ($\Delta G$) for the water decomposition reaction is equal to $58{,}900 - 13.1T$, where T is the temperature in degrees Kelvin and G is the free energy in calories per mole. At a given temperature, the equilibrium constant for the water reaction can be calculated by using the relationship $K_{eq}=e^{-G/RT}$, where G and T are as previously noted, and R is the universal gas constant. Once $K_{eq}$ is known, the ratio of the partial pressures of the various gases involved in the water breakdown can be calculated where $K_{eq}=[(pH_2)(pO_2)^{1/2}]/pH_2O$. For example, at 1450° C., $K_{eq}$ is equal to $2.47\times10^{-5}$. Thus, if a 75° F. dew point air environment ($pH_2O$ of 0.030 atmospheres) is heated to 1450° C., then $pH_2$ is calculated to be $1.59\times10^{-6}$ atmospheres (1.59 ppm). In view of this equilibrium, one can readily see that by lowering the partial pressure of oxygen, while maintaining a constant dew point ($pH_2O$) one can substantially increase the hydrogen level in the atmosphere. It should be noted that the presence of nitrogen (or other inert gas) in the preferred gas mixture does not directly participate in the water decomposition reaction. Instead, the partial pressure of the inert gas affects the partial pressure of oxygen in accordance with the ideal gas law. And, the change in partial pressure of oxygen is what influences the equilibrium gases formed, due to the water decomposition.

Table 1 shows the effect of water and oxygen level on the level of hydrogen at various temperatures in the enclosed environments of a traditional enclosure and the capsule 140.

TABLE 1

|  | Traditional Enclosure | 1% Oxygen | 0.01% Oxygen | Capsule 140 |
|---|---|---|---|---|
| Dew Pt. (Deg F.) | 80 | 80 | 80 | 140 |
| Percent Oxygen | Air (21) | 1 | 0.01 | 0.5 |
| 1250 C. (ppm H2) | 0.2 | 0.9 | 9 | 8 |
| 1450 C. (ppm H2) | 2 | 9 | 88 | 77 |
| 1650 C. (ppm H2) | 11 | 52 | 524 | 463 |

The traditional enclosure is a room size enclosure that was made in accordance with one embodiment of the invention in the aforementioned U.S. Pat. No. 5,785,726. The traditional enclosure ensures that the partial pressure of hydrogen outside components 115, 120, 122, 125, 127 and 130 in the melting/delivery system 141 is in an amount sufficient to prevent formation of oxygen blisters in the glass that is adjacent to the vessel/glass interface. Although the traditional enclosure successfully reduces the formation of gaseous inclusions in glass sheets it still has some drawbacks. First, the traditional enclosure is so large that it makes it difficult if not impossible to maintain a uniform environment around the components 115, 120, 122, 125, 127 and 130 in the melting/delivery system 141. Second, the traditional enclosure is so large and the environment is so hot and humid that it can be uncomfortable to people that walk into the enclosure.

The capsule 140 and closed-loop control system 144 of the present invention addresses these drawbacks and other drawbacks associated with the traditional enclosure. In the preferred embodiment, the capsule 140 is a relatively small enclosure that produces a small jacket volume 142 which facilitates better control of the atmosphere. This is due to fact that a probe reading (such as relative humidity or dew point temperature) for conditions inside the capsule 140 is more likely to be representative of conditions at the exterior metal surfaces of glass processing equipment because the volume in the capsule 140 is smaller than the volume in the traditional enclosure. In addition, if there is a process instability or change in the water content of the molten glass 114 that leads to an increase in hydrogen permeation blistering, then there is often no way to respond to this problem using the traditional enclosure since it may be operating at its maximum dewpoint. The capsule 140 and closed-loop control system 144 has a better chance of solving this problem.

As can be seen, the capsule 140 and closed-loop control system 144 of the present invention is essentially an enhanced version of the traditional enclosure. Again, the traditional enclosure uses a humidified air atmosphere around the metal portion of the melting/delivery system 141. And, the capsule 140 and closed-loop control system 114 create a low oxygen moist atmosphere which allows hydrogen levels one to two or more orders of magnitude greater than that which is possible with the use of a high dew point air atmosphere in the traditional enclosure. The creation of this low oxygen moist atmosphere also extends the range of glasses that can be protected from hydrogen permeation blistering.

Figure 2:
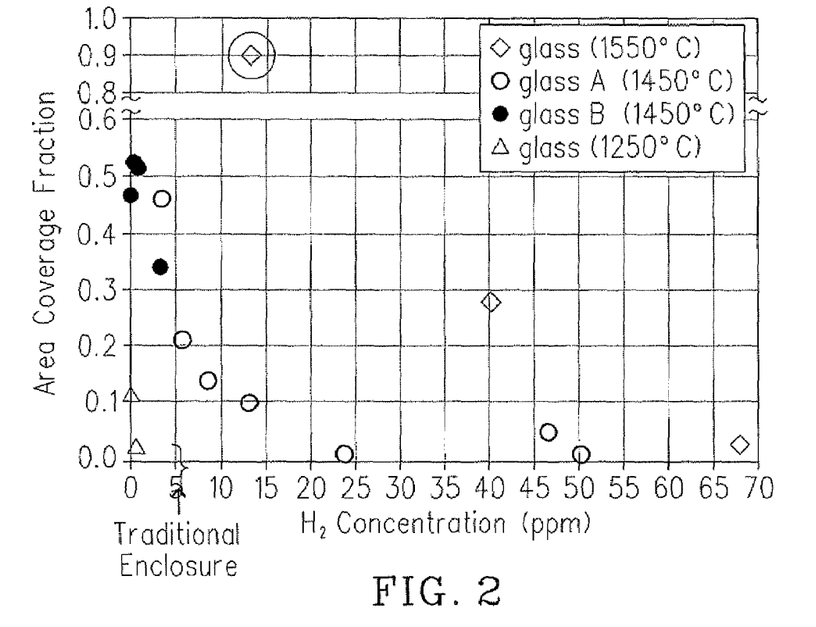
FIG. 2 is a graph which shows the amount of blister generation (measured in area coverage of blisters) versus hydrogen level in the atmosphere on the exterior surface of a platinum glass processing vessel that could be used in the exemplary glass manufacturing system shown in FIG. 1.

Referring to FIG. 2, there is a graph which shows the amount of blister generation (area coverage of blisters on the glass contact surface of platinum) vs. hydrogen level in the atmosphere on the exterior (non glass contact surface) of a platinum apparatus. As can be seen, the low hydrogen levels commonly associated with the humid air atmosphere in the traditional enclosure had unacceptable blistering over a wide range of temperatures. And, the high hydrogen atmosphere associated with the capsule 140 and the closed-loop control system 144 was very effective in suppressing the blistering in glass. Again, the traditional enclosure works well but the capsule 140 and the closed-loop control system 144 of the present invention work even better at allowing blister suppression over a broad range of temperatures and glasses.

Figure 3:
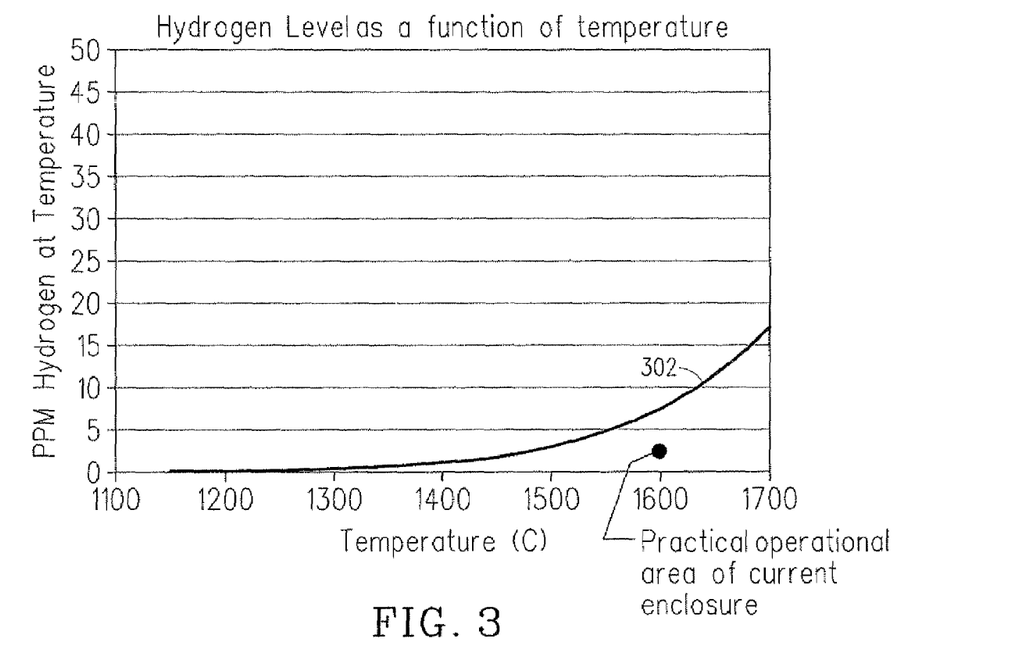
FIG. 3 is a graph that is used to help explain the different operating conditions in terms of ppm hydrogen vs. temperature that are possible with known techniques and with the invention.

Referring to TABLE 1 and FIG. 2, it can be seen that it is difficult for the traditional enclosure to maintain an atmosphere with 12 ppm of hydrogen at 1650° C. This is because with the traditional enclosure it is not possible to create a low oxygen atmosphere since people can and often enter and exit the enclosed room. FIG. 3 is a graph that illustrates this difference and other differences in terms of ppm hydrogen vs. temperature as they relate to different operating conditions within the traditional enclosure and the capsule 140. Typically, the area above the curve 302 is the area where the capsule 140 can operate but it would be difficult to operate the traditional enclosure. And, both the capsule 140 and the traditional enclosure can effectively operate in the area below the curve 302.

In view of FIG. 3, it can be seen that in order to improve upon the traditional enclosure then the hydrogen level in the atmosphere of the capsule 140 should be greater than or equal to the hydrogen level calculated in the following equation which uses the equilibrium relationship:

$$pH_2 \text{ (ppm)} = 78{,}000 \times e^{-(G/RT)} \qquad (1)$$

where G, R and T have been previously defined. This equation and the graph shown in FIG. 3 were based on the $pH_2O$ and $pO_2$ conditions in a traditional enclosure that tops out at a 80° F. dew point. In addition, this equation can re-written in numerical form as:

$$pH_2 \text{ (ppm)} = 78{,}000 \times e^{-[(-58{,}900+13.1\,T)/(1.987*T)]} \qquad (2)$$

where temperature is in degrees Kelvin.

Figure 4:
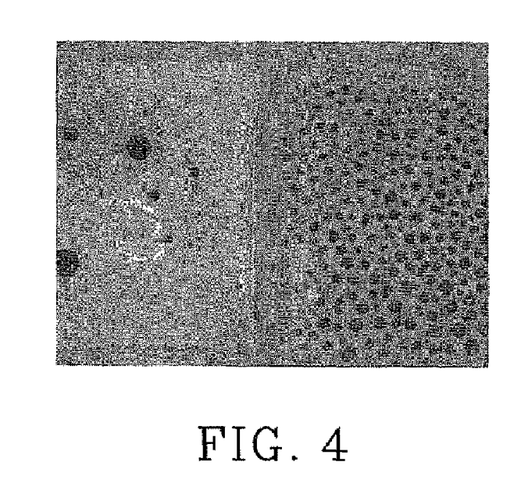
FIG. 4 is a photograph showing two glass samples that were melted in an identical platinum glass processing vessel for about ten minutes, one of the samples was processed in accordance with known techniques, the other sample was processed in accordance with the invention.

An example of the impact that a moist, low oxygen atmosphere has on glass is shown in FIG. 4. The photograph in FIG. 4 shows two glass samples that were melted in identical platinum vessels that were 0.005" thick for ten minutes at 1450° C. The glass on the right was melted using known techniques in a 20° C. dew point air atmosphere, while the glass on the left was melted in accordance with the invention in a 20° C. dew point atmosphere containing 0.01% oxygen. To highlight the bubbles that were generated at the platinum-glass interface, after testing, the platinum was peeled from the glass and modeling clay was pressed into the bubble areas. It is clear that the glass exposed to the reduced oxygen atmosphere, which had a higher level of hydrogen, had significantly less blisters than the glass tested in air.

As described above, the closed-loop control system 144 controls the moist, low oxygen atmosphere within the capsule 140 to inhibit the generation of gaseous inclusions in the glass sheet 137. In the preferred embodiment, the closed-loop control system 144 accomplishes this by controlling a gas system that has a mixture of water vapor, oxygen and nitrogen within the capsule 140. The typical values of oxygen would be from 0.01% to 1%, water from 2 to 20%, with the balance of the gas being nitrogen (or another inert gas like argon). The gas system could be run as high as 21% oxygen and have a dew point as high as 200° F. And, a gas system with 0.01% oxygen and 20% water at a 200° F. dew point can give a range of hydrogen from 1 to 38,000 ppm at 1700° C. Alternatively, the mixture of gases introduced into the jacket volume 142 of the capsule 140 may include hydrocarbons (and oxygen), ammonia, cracked ammonia products and/or combustion products.

Referring again to FIG. 1, the glass manufacturing system 100 can also incorporate two optional enhancements which are described next. The first enhancement involves the use of a constriction plate 174 (or similar device) within the capsule 140 that constricts the flow of gas over a certain section or sections of the mixing/delivery system 141. In the preferred embodiment, the constriction plate 174 is located at an end of the fining vessel 115 such that 95% (for example) of the gas is diverted into pipe 166a and 5% (for example) of the gas flows over the fining vessel 155 and exits through pipe 166b. This configuration enables one to design a laminar flow of gas within the capsule 140 which enhances the ability to control of the environment. Alternatively, the constriction plate 174 would not be needed if the capsule 141 was shaped such that less volume is present in a particular area between the mixing/delivery system 141 over which less gas flow would be desired.

The second enhancement involves the use of pipe 166c which provides one way to cool one or more specific components 115, 120, 122, 125, 127 and 130 in melting/delivery system 141. In this example, the finer to stir chamber connecting tube 122 (FSC tube 122) is cooled. As shown, pipe 166c has one end 168a connected to the main pipe 166 at a location prior to entering the capsule 140. And, pipe 166c has another end 168b that is directly connected to an inlet 170 that provides gas flow around the FSC tube 122. The FSC tube 122 also has an outlet 172 through which the gas mixture from pipe 166c is directed back into the atmosphere within the capsule 140. The second enhancement is an important aspect of the present invention in that it helps one to better control the heat transfer in the glass manufacturing system 100. This heat transfer control can be done at the same time the present invention is used to control the atmosphere for hydrogen permeation control.

In another aspect of the present invention, the capsule 140 and the closed-loop control system 144 can be used to cool the components 115, 120, 122, 125, 127 and 130 in the melting/delivery system 141 even without the second enhancement. In particular, the present invention can be used to help cool the molten glass 114 when it is moved from high temperature conditions suitable for melting to lower temperature conditions suitable for forming. Typically, the glass 114 needs to be cooled about 400° C. To help cool the molten glass 114, the capsule 140 and closed-loop control system 144 uses forced convection which is related to the gas flow outside the components 115, 120, 122, 125, 127 and 130. Since, the capsule 140 is relatively small and has openings at known locations which are used to connect to pipes 166, 166a, 166b and 166c, the heat transfer can be carefully controlled, and cooling performance can be replicated from one installation to the next. Moreover, the laminar flow associated with the first enhancement described above can also be used to help one better control the heat transfer.

In contrast, the traditional enclosure has difficulty controlling the heat transfer because the gas flow is uncontrolled and depends on the different local temperatures and air flows within the enclosed room. As a result, the local cooling rate on the mixing/delivery system 141 in the traditional enclosure can only be controlled by the raising or lowering of local zone electrical heating devices. However, the local cooling rate can be adjusted inside the capsule 140 by both heater power and gas flow rate. This allows a larger range of cooling control capacity for glass flow as indicated in TABLE 2.

TABLE 2

| Glass Flow | Capsule 140 | Traditional Enclosure |
|---|---|---|
| Nominal | X | X |
| Minimum | 0.75X | 0.85X |
| Maximum | 1.35X | 1.2X |

As shown in TABLE 2, the traditional enclosure has a minimum glass flow boundary of 0.85× which occurs when the heater power reaches its maximum. And, the traditional enclosure has a maximum glass flow boundary of 1.2× which occurs when the heater power is turned back far enough that some circuits are turned off. If the circuits are turned off, then the effective control of cooling is lost. The capsule 140 enables these boundaries to be extended to 0.75×-1.35× (for example) when air cooling is also variable. In addition, the flow boundaries associated with the capsule 140 are dictated by cooling capacity, not by head loss or other considerations. Thus, the capsule 140 enables one to control the cooling by forced convection. This type of control is not possible in the traditional enclosure because the enclosed room is so large and personnel can enter and leave the enclosed room.

Figure 5:
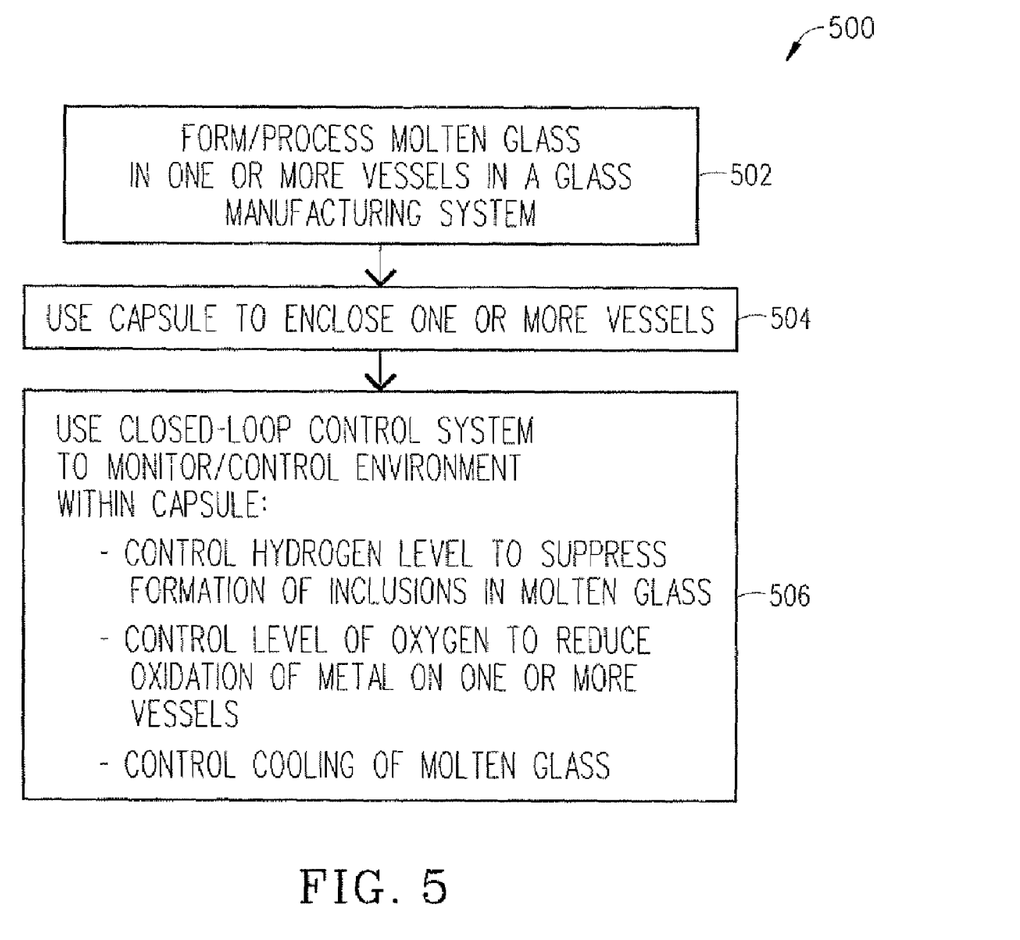
FIG. 5 is a flowchart illustrating the basic steps of a method for making a glass sheet in accordance with the present invention.

Referring to FIG. 5, there is a flowchart illustrating the basic steps of a method 500 for making a glass sheet 137 in accordance with the present invention. Beginning at step 502, molten glass 114 is formed and processed within a melting vessel 110, a fining vessel 115, a mixing vessel 120, a delivery vessel 125, and a forming vessel 135. At step 504, the capsule 140 is used to enclose one or more of these vessels 110, 115, 120, 125 and 135 and tubes 113, 122, 127 and 130. In the preferred embodiment, the capsule 140 encloses the vessels 110, 115, 120 and 125 and tubes 122, 127 and 130 which are associated with the melting/delivery system 141 (see FIG. 1). At step 506, the closed-loop control system 144 is used to create, monitor and control a humid, low oxygen atmosphere within the capsule 140. In the preferred embodiment, the closed-loop control system 144 is used to control the level of hydrogen within a mixture of gases so that at least 12 ppm of hydrogen at 1650° C. (for example) (see TABLE 1, and FIGS. 2-3) is present around the exteriors of the enclosed vessels 110, 115, 120 and 125 so as to reduce hydrogen permeation from the molten glass 114 and effectively suppress the formation of undesirable gaseous inclusions within the molten glass 114. In addition, the closed-loop control system 144 can be used to control the level of oxygen that is present around the exteriors of the enclosed vessels 110, 115, 120 and 125 so as to reduce the oxidation of the precious metal on the enclosed vessels 110, 115, 120 and 125 and tubes 122, 127 and 130. Moreover, the closed-loop control system 144 can be used to control the cooling of the molten glass 114 while it travels from one of the vessels (fining vessel 115) to another one of the vessels (mixing vessel 120).

Following are some advantages, features and uses of the present invention:

The present invention could be used by any glass manufacturer that melts, delivers or forms glass in a system in which the glass contacts a precious metal device having one surface in contact with the glass and the other surface being a noncontact glass surface. This precious metal device does not need to be a vessel but instead could be some other device like a thermocouple sheath, stirrer or bowl liner (for example). In addition, the present invention could be beneficial in the manufacturing of Vycor tubing and sheet. Moreover, the present invention is beneficial in the manufacturing any type of glass product.

The present invention reduces the oxidation of the external surfaces of the platinum containing components. Current technology relies on a coating, such as Rokide (aluminum oxide) that is placed on the outer surface of platinum containing components to limit the contact of air (oxygen) with the precious metal. This invention provides a means of lowering the oxygen level, which is a key driver in the undesirable oxidation reaction of platinum. There are many advantages to using an inert or reducing atmosphere to prevent platinum oxidation. First, the removal/reduction of oxygen decreases the rate of oxidation by orders of magnitude. The best coatings typically decrease oxidation by a factor of 2 to 4×. Secondly, the removal/reduction of oxygen eliminates the need to use thicker sections of platinum in the vessels to stop failures due to oxidation. As a result, the cost for vessels would be less than a system designed with thicker sections for improved life. Thirdly, the use of an inert or reduced gas coverage within the capsule 140 makes it possible to protect all areas of the precious metal system, even the areas that are intricate in shape which would be difficult to coat.

The present invention can be used in any glass or melting system in which glass comes in contact with precious metals such as gold, platinum, rhodium, iridium, molybdenum, palladium, rhenium tantalum, titanium, tungsten and alloys thereof. This contact could be in the melting, delivery or forming phase of production.

This present invention eliminates the need for adding multivalent species (fining agents) in the glass such as arsenic and antimony oxides to buffer oxidation reactions at the Platinum glass interface. And, if a multivalent specie is needed for fining, its concentration can be minimized. In addition, multivalent species that are less effective as fining agents can if needed be used, that are not considered hazardous materials. This increases the number of possible glass compositions and also allows for a fully environmentally friendly glass to be produced.

The present invention requires no internal intervention into the glass melting/delivery system 141, and can be applied anywhere on the system from the external surface.

The capsule 140 can be a simple container or barrier that is capable of maintaining a positive pressure of the low oxygen environment. For instance, the capsule 140 can be something as simple as a plastic or rubber bag or something that is more permanent like an enclosure which is shown in FIG. 1.

It should be appreciated that the capsule 140 can also enclose other components in the mixing/delivery system 141 in addition to components 115, 120, 125 and tubes 122, 127 and 130. For instance, the capsule 140 can also enclose components 113 and 132.

It should also be appreciated that the capsule 140 can have more or less inlets and outlets than shown in FIG. 1.

A user of the present invention does not have to be concerned about having too high a level of hydrogen around the melting/delivery system 141 which can impact the integrity of the precious metal vessels. Because, the present invention uses a nitrogen, water, oxygen environment which makes it difficult if not impossible to get hydrogen levels to the extent that glass constituents (e.g., Fe, SN, As, Sb) would be reduced, causing the metal of the system to be attacked and destroyed.

For more details about the aforementioned fusion process reference is made to U.S. Pat. Nos. 3,338,696 and 3,682,609. The contents of these two patents are incorporated herein by reference.

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A glass manufacturing system comprising:
a melting, fining, delivery, and forming vessel, each vessel includes an inner wall which contacts molten glass;
a capsule that encloses at least one of the vessels;
a closed-loop control system that monitors and controls an environment within said capsule and around a non-glass contact surface of said at least one vessel; and
wherein said closed-loop control system controls a level of hydrogen within a mixture of gases in the environment so that a partial pressure is maintained at or greater than a level defined by an equilibrium relationship $$pH_2(ppm) = 78000 \times e^{\frac{-58900+13.1T}{1.987T}}$$

around the non-glass contact surface of said at least one vessel to suppress the formation of undesirable gaseous inclusions within the molten glass, where T is a temperature in Kelvin of the non-glass contact surface of said at least one vessel.

2. The glass manufacturing system of claim 1, wherein said closed-loop control system further controls a level of oxygen within the gas mixture in the environment around the non-glass contact surface of said at least one vessel to reduce oxidation of a precious metal on said at least one vessel.

3. The glass manufacturing system of claim 1, wherein said closed-loop control system further controls a cooling of the molten glass while the molten glass travels from one of said at least one vessel to another one of said at least one vessel.

4. The glass manufacturing system of claim 1, wherein said gas mixture includes up to 38,000 ppm of hydrogen at the non-glass contact surface of said at least one vessel.

5. The glass manufacturing system of claim 1, wherein said gas mixture is maintained at a dew point temperature of 200° F. or lower.

6. The glass manufacturing system of claim 1, wherein said gas mixture has an oxygen content with a level of less than 21% by volume.

7. The glass manufacturing system of claim 1, wherein said gas mixture has an oxygen level of 0.01% to 1% by volume and a water vapor level of 2% to 20% by volume, with the balance being essentially an inert gas.

8. The glass manufacturing system of claim 1, wherein said gas mixture includes cracked ammonia products or combustion products.

9. The glass manufacturing system of claim 1, wherein said non-glass contact surface of said at least one vessel includes a metal selected from gold, platinum, rhodium, iridium, molybdenum, palladium, rhenium, tantalum, titanium, tungsten and alloys thereof.

10. A system for controlling an environment around at least one vessel in a glass manufacturing system, said system comprising:
 a capsule that encloses said at least one vessel;
  a closed-loop control system that controls a level of hydrogen within a mixture of gases located within said capsule so that a partial pressure is maintained at or greater than a level defined by an equilibrium relationship $pH_2$ (ppm)=$78{,}000 \times e^{[(-58{,}900+13.1\ T)/(1.987 * T(° K.))]}$ around a non-glass contact surface of said at least one vessel to effectively suppress formation of undesirable gaseous inclusions within the molten glass located within said at least one vessel.

11. The system of claim 10, wherein said closed-loop control system further controls a level of oxygen within the gas mixture around the non-glass contact surface of said at least one vessel to reduce oxidation of a precious metal on said at least one vessel.

12. The system of claim 10, wherein said closed-loop control system further controls a cooling of the molten glass while the molten glass travels from one of said at least one vessel to another one of said at least one vessel.

13. The system of claim 10, further comprising a constrictor plate positioned around the non-glass contact surface of one of said at least one vessel that reduces a flow of the gas mixture over that vessel and causes a laminar flow of the gas mixture within said capsule.

14. The system of claim 10, wherein said closed-loop control system includes:
 a controller;
 a plurality of sensors;
 a humidity feed system;
 a heating/cooling control system;
 a air handler; and
 an $O_2/N_2$ makeup system.

* * * * *

UNITED STATES PATENT AND TRADEMARK OFFICE
CERTIFICATE OF CORRECTION

| | | |
|---|---|---|
| PATENT NO. | : 7,628,039 B2 | Page 1 of 1 |
| APPLICATION NO. | : 12/366245 | |
| DATED | : December 8, 2009 | |
| INVENTOR(S) | : Gilbert De Angelis et al. | |

It is certified that error appears in the above-identified patent and that said Letters Patent is hereby corrected as shown below:

*On the Title Page & Col. 1 lines 1-4*         *Description*

Item (54)         Title reads:

SYSTEM AND METHOD FOR CONTROLLING THE ENVIRONMENTAL AROUND ONE OR MORE VESSELS IN A GLASS MANUFACTURING SYSTEM

Title should read:

SYSTEM AND METHOD FOR CONTROLLING THE ENVIRONMENT AROUND ONE OR MORE VESSELS IN A GLASS MANUFACTURING SYSTEM

Signed and Sealed this

Twenty-fourth Day of August, 2010

David J. Kappos
*Director of the United States Patent and Trademark Office*